US009997936B2

(12) United States Patent
Cogill et al.

(10) Patent No.: US 9,997,936 B2
(45) Date of Patent: Jun. 12, 2018

(54) SYSTEM FOR CHARGING MOBILE DEVICE USING AN AD-HOC INFRASTRUCTURE WITH ENERGY HARVESTING CAPABILITIES

(71) Applicant: International Business Machines Corporation, Armonk, NY (US)

(72) Inventors: Randall L. Cogill, Dublin (IE); Chungmok Lee, Gyeonggi-do (KR); Zubair Nabi, Lahore (PK); Joe Naoum-Sawaya, Dublin (IE); Martin Rufli, Winterthur (CH); Robert Shorten, Dublin (IE); Tigran Tchrakian, Dublin (IE); Rudi Verago, Dublin (IE); Fabian Wirth, Bremen (DE); Sergiy Zhuk, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/830,811

(22) Filed: Dec. 4, 2017

(65) Prior Publication Data
US 2018/0090960 A1 Mar. 29, 2018

Related U.S. Application Data

(63) Continuation of application No. 14/980,341, filed on Dec. 28, 2015.

(51) Int. Cl.
*H02J 7/00* (2006.01)
*H04W 4/02* (2018.01)
(Continued)

(52) U.S. Cl.
CPC .......... *H02J 7/0044* (2013.01); *H04B 1/3883* (2013.01); *H04W 4/028* (2013.01); *H04W 84/18* (2013.01)

(58) Field of Classification Search
USPC ........................................................ 320/109
See application file for complete search history.

(56) References Cited

U.S. PATENT DOCUMENTS 7,062,300 B1  6/2006 Kim
8,513,832 B2  8/2013 Hunter et al.
(Continued)

FOREIGN PATENT DOCUMENTS

CN    203193292 U    9/2013
CN    103545900 A    1/2014
(Continued)

OTHER PUBLICATIONS

Office Action dated Jun. 8, 2016 from parent U.S. Appl. No. 14/980,341.
(Continued)

*Primary Examiner* — Robert Grant
(74) *Attorney, Agent, or Firm* — Scully, Scott, Murphy & Presser, PC; Kurt P. Goudy, Esq.

(57) ABSTRACT

A system and method for charging of a mobile device in an ad hoc parked vehicle charging system. A plurality of mobile device users and charging vehicles are registered in the ad hoc parked vehicle charging system. The current charge of an authenticated mobile device user is monitoring and the user is automatically alerted the authenticated user that the current charge is below a threshold set in the user's charging profile. The method includes locating registered charging vehicles parked within a preset distance range of the authenticated user and sending the parked location information to the user, automatically enabling a wireless charging connection between the authenticated user's mobile device and a parked registered charging vehicle selected by the user and automatically controlling charging the authenticated user's mobile device according to the authenticated user's charging (Continued)

profile and the parked registered charging vehicle's charge supply profile.

20 Claims, 4 Drawing Sheets

(51) Int. Cl.
*H04B 1/3883* (2015.01)
*H04W 84/18* (2009.01)

(56) References Cited

U.S. PATENT DOCUMENTS

| | | | |
|---|---|---|---|
| 8,862,404 | B2 | 10/2014 | Proietty et al. |
| 2010/0202627 | A1 | 8/2010 | Gray |
| 2011/0018498 | A1 | 1/2011 | Soar |
| 2011/0025267 | A1 | 2/2011 | Kamen et al. |
| 2013/0093389 | A1 | 4/2013 | Parvoti |
| 2013/0204471 | A1* | 8/2013 | O'Connell .............. H02J 3/008 701/22 |
| 2013/0226441 | A1 | 8/2013 | Horita |
| 2014/0257884 | A1* | 9/2014 | Kyoung ................. G06Q 10/02 705/5 |
| 2014/0266041 | A1 | 9/2014 | Ghosh et al. |

FOREIGN PATENT DOCUMENTS

| | | |
|---|---|---|
| CN | 103556839 A | 2/2014 |
| CN | 103840518 A | 6/2014 |

OTHER PUBLICATIONS

Office Action dated Oct. 6, 2016 from parent U.S. Appl. No. 14/980,341.
Office Action dated Feb. 10, 2017 from parent U.S. Appl. No. 14/980,341.
Office Action dated May 8, 2016 from parent U.S. Appl. No. 14/980,341.
Notice of Allowance dated Sep. 27, 2017 from parent U.S. Appl. No. 14/980,341.
List of IBM Patents or Patent Applications Treated as Related dated Dec. 4, 2017, pp. 2.

* cited by examiner

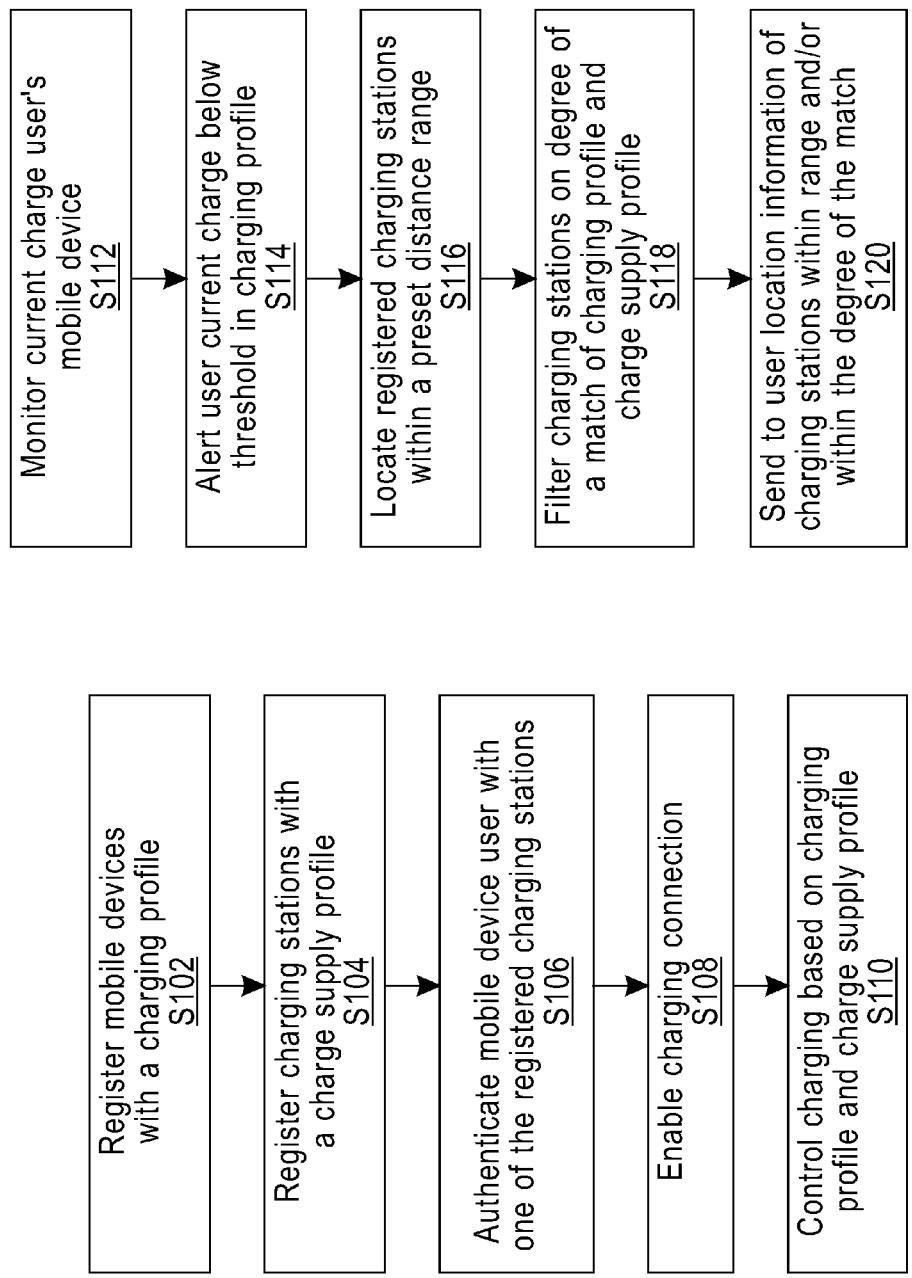

SYSTEM FOR CHARGING MOBILE DEVICE USING AN AD-HOC INFRASTRUCTURE WITH ENERGY HARVESTING CAPABILITIES

BACKGROUND OF THE INVENTION

This disclosure relates generally to charging mobile devices and more particularly to a system and method for charging of a mobile device in an ad hoc charging system.

Today, drivers and car passengers charge their mobile devices inside their cars. Other people on the street have to find a place to charge their mobile device if they run out of battery. Often they either have to find a restaurant or a coffee shop that allows them to charge the mobile device or risk staying for an extended period of time disconnected and looking for a place to charge the battery. Few public charging stations are available in large cities and making such stations widely available would require extensive infrastructure investment.

While there are known systems for recharging electric vehicles using other electric vehicles, there is currently a need for a system focused on recharging mobile devices while accounting for the movement of the mobile device user.

SUMMARY OF THE INVENTION

In one embodiment a computer implemented method for charging of a mobile device in an ad hoc charging system is disclosed. The method includes registering a plurality of mobile device users in an ad hoc parked vehicle charging system, the registration includes a charging profile. The method also includes registering a plurality of charging vehicles in the ad hoc parked vehicle charging system, the registration including a charge supply profile. A mobile device user is authenticated as an ad hoc parked vehicle charging system registered user in the ad hoc parked vehicle charging system. The method includes monitoring the current charge of the authenticated user's mobile device and automatically alerting the authenticated user that the current charge is below a threshold set in the user's charging profile; locating one or more of the plurality of registered charging vehicles parked within a preset distance range of the authenticated user and sending the parked location information of the one or more registered charging vehicles within the preset distance range to the authenticated user; automatically enabling a wireless charging connection between the authenticated user's mobile device and a parked registered charging vehicle parked at a location within the preset distance of the authenticated user's mobile device, the parked registered charging vehicle being selected by the user from the parked location information; and automatically controlling charging the authenticated user's mobile device according to the authenticated user's charging profile and the parked registered charging vehicle's charge supply profile.

A system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 2 is flow chart of one embodiment of a method for charging of a mobile device in an ad hoc charging system.

FIG. 3 is flow chart of another embodiment of a method for charging of a mobile device in an ad hoc charging system.

DETAILED DESCRIPTION

Figure 1:
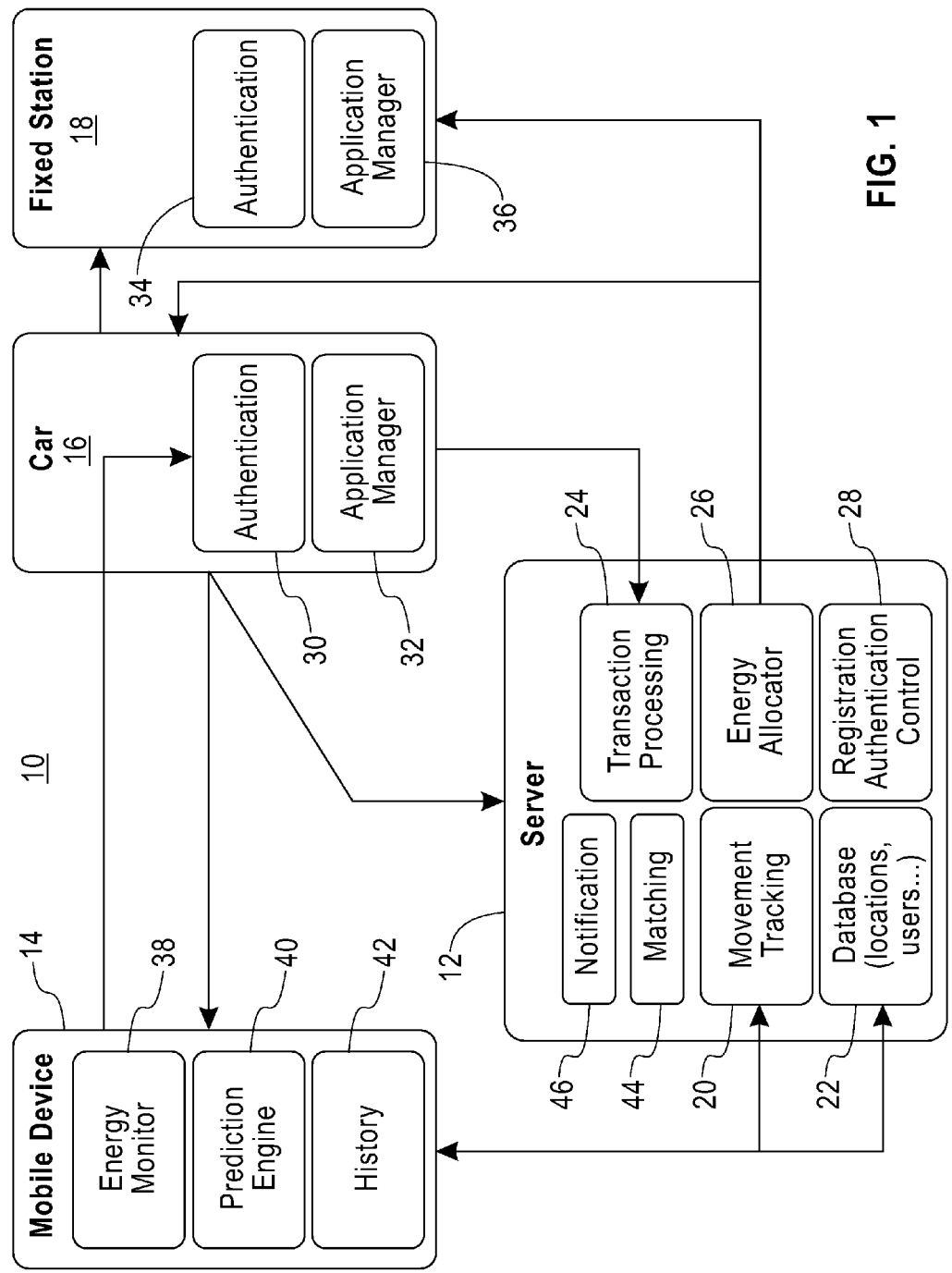
FIG. 1 is block diagram of one embodiment of a system for charging of a mobile device in an ad hoc charging system.

This disclosure relates to using an ad-hoc infrastructure with harvestable renewable energy capabilities to charge mobile devices, for example, mobile phones, tablets, cameras, electric wheel chairs or any other mobile device that has a battery that can be charged. An example of an ad-hoc infrastructure with harvestable renewable energy capabilities are parked electric vehicles. The energy supplier will recharge itself with its normal operation, so energy is renewable and will be wasted if not used. Individuals charge their mobile devices from the battery of the ad-hoc infrastructure. The individuals are not necessarily the vehicle owners, drivers, or passengers but rather anyone participating in the system within a distance limitation. The infrastructure owners are compensated either financially from the person charging the mobile device or through credit that allows them to use the system for free or use other services such as free city parking or preferred parking spaces.

Electric vehicles harvest energy from driving or other sources and store it in large batteries. The infrastructure is self-refreshed as new vehicles are brought to market and thus new technology is continuously being deployed without any additional replacement costs, such as replacing the charging station at a coffee shop or a lighting poll by a new model. The infrastructure is ad-hoc in the sense that the location is not fixed and moves with the travel patterns of people and thus moves to areas of high demand. For example, during the day a large concentration of vehicles are present in business areas while in the evening a large concentration of vehicles are in entertainment areas and late at night at residential areas. The infrastructure is dense as there are parked cars are everywhere.

Mechanisms that enable pricing, authentication, and automated processing of financial transactions are components of one embodiment of the invention. Suppliers can set the price they wish to charge for energy and consumers can set a profile containing a price they are willing to pay for energy. This information is used to match consumers to nearby suppliers, and can be used to automatically initiate charging from multiple vehicles without intervention from either the supplier or consumer.

Short range systems such as MagMIMO® that can detect when a phone is in range and directs a magnetic field to charge a phone safely at a range of 30 cm can be used in the present system. Extended range wireless charging systems that are currently available that can charge a phone at distances up to 9 m can also be used in the present invention. The extended range wireless charging systems currently available, such as Cota®, use steered phased array microwave antennas and the time-reversal properties of electromagnetic radiation to focus the power on the receiver and prevent the radiation to hit obstacles resulting in a safe charging system.

Several thousands of antennas are used to detect the exact direction at which the wireless charging should be directed to reach the receiver. The locator beacon is pulsed 100 times/sec and thus the transmitter is easily able to track the motion of the charging receiver as it moves.

In one example of an embodiment of the invention, John is walking on the sidewalk making phone calls from his cell phone. The phone battery starts to become dangerously low. John is participating in the parked cars charging station system. The system detects that John's phone is running low on battery and sends him an alert pointing him to the parked cars that are close to him and are offering a charging station service along with the corresponding charging cost for each car. John chooses one of the cars that is offering a reasonable charging quote and walks towards that car. John puts his mobile phone on the wireless fast charging pad on the car or connects wirelessly to the car and waits for the battery charge to reach a desired level. Alternatively he could have used the plug that is equipped on the car. John removes his phone from the wired connection or disconnects the wireless connection after acquiring the desired charge and continues his walk. The system deducts the charging cost from John's account and credits the car owner accordingly.

In a second example of an embodiment of the invention, Jane is walking on the sidewalk with her phone in her handbag. Jane is participating in the parked cars charging station system.

Jane's phone battery is at 15% charge. Jane has previously setup her profile on the system indicating that she would like to receive energy to her phone from parked cars if the phone battery falls below 16% and if the charging cost is less than a certain monetary amount per watt. Cars that are also participating in this system and have enough charge detect when Jane's phone is close and wirelessly transmit energy to Jane's phone. The system automatically deducts the charging cost from Jane's account and credits accordingly the owners of the cars that transmitted energy to Jane's phone.

FIG. 1 is a block diagram of one embodiment of the ad hoc charging system 10 of the invention. The system 10 includes a computer server 12 having one or more computer processors, one or more non-transitory computer-readable storage media and program instructions, stored on the one or more non-transitory computer-readable storage media, which when implemented by the one or more processors, cause the computer server to perform certain steps of the method of the invention. Server 12 can also be a cloud-based system.

A mobile device 14 seeks to obtain battery charge from a mobile charging station 16, such as a parked car. The energy may be obtained directly from car 16 or from a fixed charging station 18 coupled to car 16. The server 12 includes a movement tracking module 20, a database 22, a transaction processing module 24 an energy allocation module 26 and a registration, authentication and control module 28. The server 12 also includes a profile matching module 44 and a user notification module 46. The mobile charging station 16 includes an authentication module 30 and an application manager 32. The fixed charging station 18 also includes an authentication module 34 and an application manager 36. The mobile device 14 includes an energy monitoring module 38, an energy prediction engine 40 and an energy usage history module 42. Alternatively, modules 38, 40 and 42 can be on server 12.

The mobile device users 14 that are participating in the system first register an account using module 28. The account registration contains a charging profile related to the battery status notification and charging limits and related to the desired charging costs, such as the highest price the user is willing to pay. The profile also includes authentication identification information. The charging profile is stored in database 22. The charging stations 16, 18 that are participating in the system also first register an account using module 28 with a charge supply profile, such as the maximum energy that each station can provide along with a quote of the charging cost. The charging supply profile is also stored in database 22.

The authentication module 28 authenticates a mobile device user as an ad hoc charging system registered user with one of the registered charging stations, thereby enabling a charging connection between the authenticated user and the one registered charging station. The authentication module 28 then enables the charging of the authenticated user's mobile device according to the authenticated user's charging profile and the one registered charging station's charge supply profile.

The movement tracking module 20 obtains the user's location and the current battery charge. Alternately, module 20 may be on the mobile device application. The movement tracking module 20 obtains the location information of the user when the user logs into the system and requests information on available charging stations or by tracking the movement of the user. Matching module 44 suggests to the user the locations of the stations that match the profile setting and can provide battery charging service. Alternatively, module 44 can be on the mobile device application, in which case the matching is done locally between the mobile device and the charging stations. For each individual user requesting a battery charging service, matching module 44 filters the list of stations that are within a desired maximum distance and maximum charging cost. Notification module 46 notifies the individual user 14 with the information related to the matching station. Once the individual user 14 reaches the desired station, the user uses the mobile device charging mechanism that is equipped on the station, which can be wireless or wired. The transaction module 24 processes a transaction deducting the charging cost from the account of the individual user 14 receiving the service and credits the account of the owner of charging station 16 that is providing the service.

The charging station 16, 18 must recognize and authenticate the mobile device 14 when it is close in order to provide the charging service to the device that is requesting it. Authentication modules 30, 34 implement authentication wirelessly using systems known in the art. The mobile device and the wireless charging system communicate with each other to verify the authenticity, power requirements and other characteristics of the mobile device and battery to verify and handshake the presence of the mobile device within proximity to the charging station.

The application manager 32, 36 is responsible to orchestrate all the operations of the charging device/station. The application manager acts like a controller to manage the charging process if the server is not present or not currently available. The application manager may therefore incorporate one or more of the modules that are also on the server, such as, for example, the transaction processing module 24 and the energy allocation module 26.

The authentication module 30 may implement a single-sign-on (SSO) method with the mobile device 14 allowing the exchange of authentication information across multiple charging stations, typically for a single owner of multiple charging stations, such as fleet of cars. In one example, the SSO can be accomplished by exchanging a token or a cookie. In this way the mobile device can be charged using multiple stations, which saves time for the user and saves charging resources of the owner for any additional authentication. The system can be coupled with other already existing charging infrastructures, such as private houses and public charging stations, in order to share credentials and battery profiles. Different policies can be used when multiple charging stations and mobile devices are involved such as: minimize the charging cost for the final user, minimize the battery depletion of the charging stations.

The energy monitoring module 38 monitors the state of the charge of the mobile device 14 and recognizes when the charge is below a certain threshold. The prediction engine 40 predicts the usage of the mobile device 14 and recognizes when the current battery charge is not sufficient for the future energy needs. The energy needs can be predicted by tracking the daily usage of the particular device 14 and storing the usage history in module 42. The usage history may be combed with other information such as current geographical location.

The notification module 46 sends the mobile device owner notification when events are triggered that either require user intervention or to provide information. Alternatively, module 46 may also be on the mobile device application. The events may be triggered based on a setup that is stored in the user charging profile such as sending a user notification when the battery charge drops below a certain threshold. In one embodiment, when the mobile device battery charge falls below the indicated charge limit, the mobile device requests a charging service from the system and notifies the user. If an automatic charging is indicated in the user profile, the mobile device acquires charge from vehicles that are within range and that satisfy the maximum price quote. If a setting is to ask the user is indicated, the mobile device issues a notification to the user indicating information that is received from the server relating to the parked vehicles that are offering a battery charging service within the vicinity of the individual. The individual chooses one of the vehicles and uses it to charge the mobile device.

The user notification module 46 also sends information to advise the mobile device owner on the locations where the mobile device can receive charge and also related to the cost of charging at each station. The user notification module 46 may send the information either to the device itself if it has a display and communication mechanism such as a cell phone or to other devices in the case where the device that needs charging does not have notification or connectivity capabilities, such as a camera.

The movement tracking module 20 keeps track of the location of the user and communicates with the energy optimization and allocation module 26 in order to decide from which station to provide energy in the case where multiple stations can provide energy to the device.

The movement tracking module 20 also uses statistics collected on previous travel patterns to predict the movement of the individuals such as recognize the streets that the individual walks to get to work every day. The movement tracking module 20 also collaborates with the GPS system if used to identify the travel routes that will be taken. In one example, if the user already is using the GPS to go to a destination then the movement tracking module 20 can use the GPS data to know the exact streets that will be traveled.

In one embodiment, the system may provide suggestions to the mobile device owner of new alternative paths of travel where there is high likelihood of finding charging stations available. In addition, the system may provide suggestions to the charging station owner of where to park the vehicle in order to maximize the probability of connecting with mobile devices that need charging. These suggestions are formulated using the data stored by the history module 42 and the movement tracking module 20, as well as the capabilities offered by the prediction engine 40.

The energy allocation module 26 decides on which station to provide energy to which mobile device. The energy allocation module 26 uses the information related to the needed energy of each mobile device, the location of each mobile device, and the state of charge of each charging station to decide how to allocate the energy. One approach is to provide the mobile device with the most urgent need for energy from the closest station and thus allocate the devices to charging stations accordingly. The energy allocation module 26 minimizes battery depletion of the charging stations. In one embodiment, the module 26 includes load balancing to handle the energy allocation automatically or based on users settings.

The transaction processing module 24 receives information from the energy allocation module 26 to process the transaction between the device that received the charge and the station that received the charge. The transaction is based on the type of subscription that each device has.

The mobile device owners may use a pay-as-you-go scheme where they pay for the exact charge that they received from each station or they may pay a monthly/yearly subscription rate.

The charging station owners may also participate in an earn-as-you-go scheme where they collect a fee in exchange of the exact energy that they provide. They also may collect a fixed fee or receive free access to services such as a free participation in the system, free parking spaces or free public internet. The transaction can be done in place using wireless technologies such as NFC technology. In the case of multiple charging devices, different payment policies can be used such as time-sharing or uniform splitting In one embodiment, if the network server is not available a user that wants to recharge his phone scans the neighborhood for the available charging vehicles, picks one charging vehicle according to the price filter in the profile and recharges the phone and pays locally using the NFC protocol.

In one embodiment, ad-hoc charging system is adaptable to movement, namely the user does not need to stand and wait for the charging process but he can walk along a sidewalk taking energy from multiple parked cars. The mobile device will hop from charging station to charging station.

FIG. 2 is a flow chart of one embodiment the method for charging of a mobile device in an ad hoc charging system. The method includes step S102 registering a plurality of mobile device users in the ad hoc charging system. The registration includes a charging profile for the user. The method also includes at step S104 registering a plurality of charging stations in the ad hoc charging system. The charging station registration includes a charge supply profile. In step S106 a mobile device user is authenticated as an ad hoc charging system registered user with one of the plurality of registered charging stations. Once authentication is complete, a charging connection is enabled in step S108 between the authenticated user and the one registered charging station. Thereafter, the charging of the authenticated user's mobile device is controlled at step S110 according to the authenticated user's charging profile and the one registered charging station's charge supply profile.

In one embodiment, the registered user is authenticated to obtain charge from a set of the plurality registered charging stations based on the authentication at the one registered charging station, each registered charging station in the set of the plurality of registered charging stations being identified as being part of the set in the charge supply profile of the registered charging station.

FIG. 3 is a flow chart of another embodiment in which the method includes step S112 of monitoring the current charge of the authenticated user's mobile device and step 114 of alerting the authenticated user that the current charge is below a threshold set in the user's charging profile. The method further includes step S116 of locating one or more of the plurality of registered charging stations within a preset distance range of the authenticated user, step S118 of filtering the registered charging stations within the preset distance range based on a degree of a match between the charging profile of the authenticated user and the charge supply profile of the registered charging stations within the preset distance range. The method then includes step S120 of sending the location information of the one or more registered charging stations within the preset distance range to the authenticated user and found to be within the degree of the match.

Figure 4:
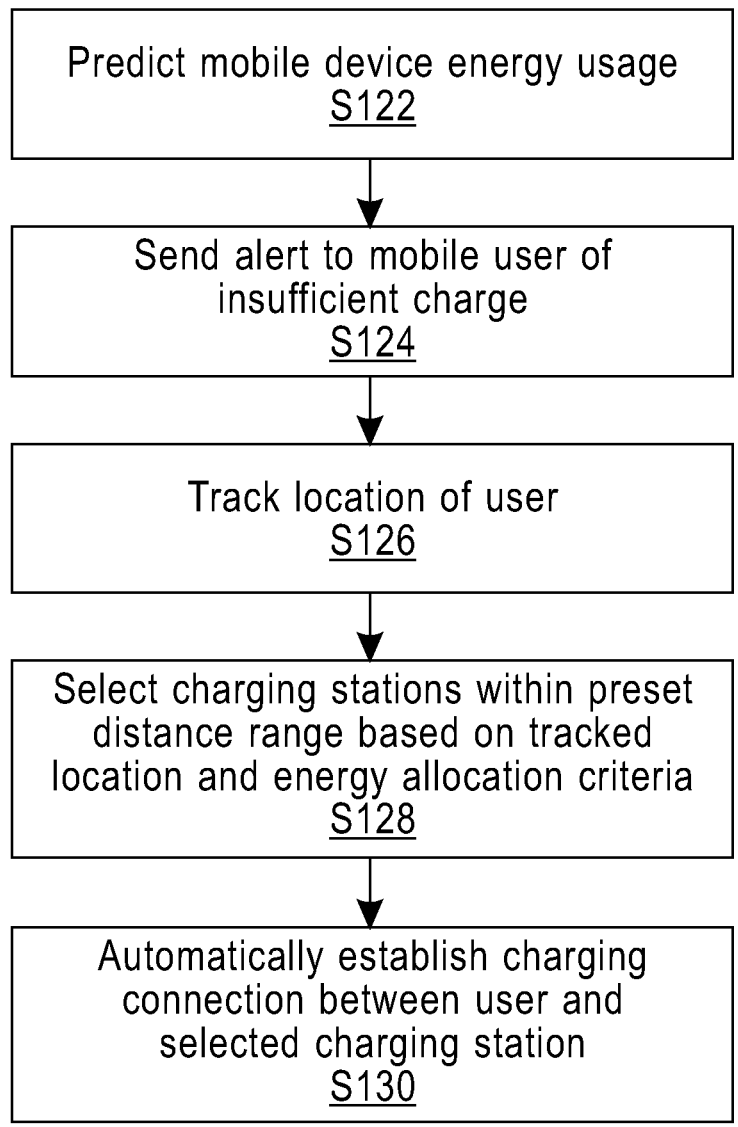
FIG. 4 is flow chart of another embodiment of a method for charging of a mobile device in an ad hoc charging system.

FIG. 4 is a flow chart of a further embodiment in which the method includes step S121 of tracking the energy use history of a registered mobile device user and step S122 of predicting the mobile device energy usage of the tracked user. In step S124 of the method includes sending an alert to the mobile device user that the current charge of the mobile device is insufficient for the predicted energy usage. Thereafter, the method includes step S126 of tracking the current location of the registered user and step S128 of selecting one of the one or more registered charging stations within the preset distance range of the authenticated user based on the tracked location of the registered user and based on an energy allocation criteria. Thereafter, the method automatically establishing a charging connection at step S130 between the authenticated user and the selected registered charging station for charging the authenticated user's mobile device.

Figure 5:
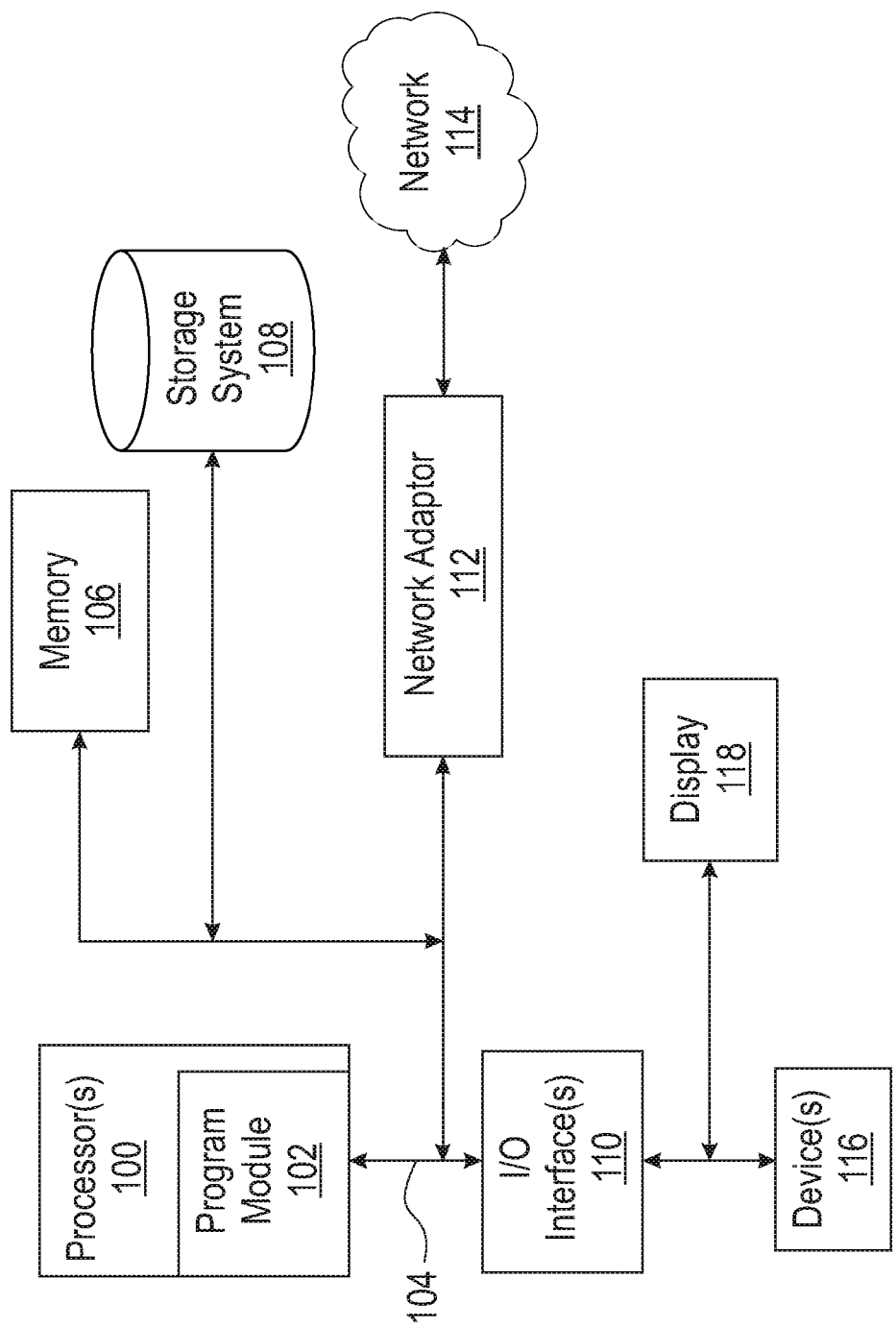
FIG. 5 is a block diagram of an exemplary computing system suitable for implementation of this invention.

FIG. 5 illustrates a schematic of an example computer or processing system that may implement the method for charging of a mobile device in an ad hoc charging system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for charging of a mobile device in an ad hoc charging system, the method comprising:
    registering a plurality of mobile device users in an ad hoc parked vehicle charging system, the registration including a charging profile, the charging profile including limits on charging cost;
    registering a plurality of charging vehicles in the ad hoc parked vehicle charging system, the registration including a charge supply profile, the charge supply profile including costs for charging, the charging vehicles being electric or hybrid electric vehicles;
    authenticating a mobile device user as an ad hoc parked vehicle charging system registered user in the ad hoc parked vehicle charging system;
    monitoring the current charge of the authenticated user's mobile device and automatically alerting the authenticated user that the current charge is below a threshold set in the user's charging profile;
    locating one or more of the plurality of registered charging vehicles parked within a preset distance range of the authenticated user and sending the parked location information of the one or more registered charging vehicles within the preset distance range to the authenticated user;
    automatically enabling a wireless charging connection between the authenticated user's mobile device and a parked registered charging vehicle parked at a location within the preset distance of the authenticated user's mobile device, the parked registered charging vehicle being selected by the user from the parked location information; and
    automatically controlling charging the authenticated user's mobile device according to the authenticated user's charging profile and the parked registered charging vehicle's charge supply profile.

2. The method of claim 1, further comprising selecting one of the one or more registered charging vehicles within the preset distance range of the authenticated user based on an energy allocation criteria and automatically establishing a charging connection between the authenticated user and the selected registered vehicle charging station for charging the authenticated user's mobile device.

3. The method of claim 2, further comprising authenticating a plurality of mobile device users as ad hoc charging system registered users in the ad hoc parked vehicle charging system, and using information related to energy need of the mobile device of each of the plurality of authenticated mobile device users, the location of each of the mobile devices, and the state of charge of each charging station with the preset distance to decide how to allocate the energy based on the energy allocation criteria.

4. The method of claim 1, wherein the one registered vehicle charging station automatically recognizes a mobile device within a preset distance as being a registered mobile device user and performs the authentication with the recognized registered mobile device user.

5. The method of claim 1, wherein the registered user is authenticated to obtain charge from a set of the plurality registered charging vehicles based on the authentication at the one registered charging vehicle, each registered charging vehicle in the set of the plurality of registered charging vehicles being identified as being part of the set in the charge supply profile of the registered charging vehicle.

6. The method of claim 3, further including filtering the registered charging vehicles within the preset distance range based on a degree of a match between the charging profile of the authenticated user and the charge supply profile of the registered charging vehicles within the preset distance range and sending the location information of the one or more registered charging vehicles found to be within the degree of the match.

7. The method of claim 1, further comprising predicting the mobile device energy usage of a registered mobile device user and sending an alert to the mobile device user that the current charge of the mobile device is insufficient for the predicted energy usage.

8. The method of claim 3, further comprising tracking the location of the registered user and selecting one of the one or more registered charging vehicles within the preset distance range of the authenticated user based on the tracked location of the registered user.

9. The method of claim 1, further comprising tracking the energy use and movement history of a registered mobile device user, predicting the mobile device energy usage of a registered mobile device user and sending a notice to the mobile device user suggesting alternative paths of travel based on the number charging vehicles available on each alternative path.

10. The method of claim 6, further comprising tracking the energy use and movement history of registered mobile device users, predicting the mobile device energy usage of registered mobile device users and sending a notice to registered vehicle charging station vehicles suggesting locations to park the vehicles based on a probability of connecting with registered mobile device users needing a charge.

11. A computer system for charging of a mobile device in an ad hoc charging system, comprising:
a server having one or more computer processors, one or more non-transitory computer-readable storage media and program instructions, stored on the one or more non-transitory computer-readable storage media, which when implemented by the one or more processors, cause the computer system to perform the steps of:
registering a plurality of mobile device users in an ad hoc parked vehicle charging system, the registration including a charging profile, the charging profile including limits on charging cost;
registering a plurality of charging vehicles in the ad hoc parked vehicle charging system, the registration including a charge supply profile, the charge supply profile including costs for charging, the charging vehicles being electric or hybrid electric vehicles;
authenticating a mobile device user as an ad hoc parked vehicle charging system registered user in the ad hoc parked vehicle charging system;
monitoring the current charge of the authenticated user's mobile device and automatically alerting the authenticated user that the current charge is below a threshold set in the user's charging profile;
locating one or more of the plurality of registered charging vehicles parked within a preset distance range of the authenticated user and sending the parked location information of the one or more registered charging vehicles within the preset distance range to the authenticated user;
automatically enabling a wireless charging connection between the authenticated user's mobile device and a parked registered charging vehicle parked at a location within the preset distance of the authenticated user's mobile device, the parked registered charging vehicle being selected by the user from the parked location information; and
automatically controlling charging the authenticated user's mobile device according to the authenticated user's charging profile and the parked registered charging vehicle's charge supply profile.

12. The computer system of claim 11, further comprising:
selecting one of the one or more registered charging vehicles within the preset distance range of the authenticated user based on the tracked location of the registered user and based on an energy allocation criteria and automatically establishing a charging connection between the authenticated user and the selected registered vehicle charging station for charging the authenticated user's mobile device.

13. The computer system of claim 12, further comprising authenticating a plurality of mobile device users as ad hoc charging system registered users in the ad hoc parked vehicle charging system, and using information related to energy need of the mobile device of each of the plurality of authenticated mobile device users, the location of each of the mobile devices, and the state of charge of each charging station with the preset distance to decide how to allocate the energy based on the energy allocation criteria.

14. The computer system of claim 13, wherein the registered user is authenticated to obtain charge from a set of the plurality registered charging vehicles based on the authentication at the one registered vehicle charging station, each registered vehicle charging station in the set of the plurality of registered charging vehicles being identified as being part of the set in the charge supply profile of the registered vehicle charging station.

15. The computer of claim 13, further including filtering the registered charging vehicles within the preset distance range based on a degree of a match between the charging profile of the authenticated user and the charge supply profile of the registered charging vehicles within the preset distance range and sending the location information of the one or more registered charging vehicles found to be within the degree of the match.

16. The computer system of claim 11, further comprising predicting the mobile device energy usage of a registered mobile device user and sending an alert to the mobile device user that the current charge of the mobile device is insufficient for the predicted energy usage.

17. The computer system of claim 11, further comprising tracking the energy use and movement history of one or more registered mobile device user, predicting the mobile device energy usage of one or more registered mobile device user and sending a notice to one or more mobile device users suggesting alternative paths of travel based on the number of charging vehicles available on each alternative path, and sending a notice to one or more registered charging vehicles suggesting locations to park the vehicles based on a probability of connecting with registered mobile device users needing a charge.

18. A non-transitory article of manufacture tangibly embodying computer readable instructions, which when implemented, cause a computer to perform the steps of a method for controlling one or more drones to respond to a request for information, comprising;
registering a plurality of mobile device users in an ad hoc parked vehicle charging system, the registration including a charging profile, the charging profile including limits on charging cost;
registering a plurality of charging vehicles in the ad hoc parked vehicle charging system, the registration including a charge supply profile, the charge supply profile including costs for charging, the charging vehicles being electric or hybrid electric vehicles;
authenticating a mobile device user as an ad hoc parked vehicle charging system registered user in the ad hoc parked vehicle charging system;
monitoring the current charge of the authenticated user's mobile device and automatically alerting the authenticated user that the current charge is below a threshold set in the user's charging profile;
locating one or more of the plurality of registered charging vehicles parked within a preset distance range of the authenticated user and sending the parked location information of the one or more registered charging vehicles within the preset distance range to the authenticated user;
automatically enabling a wireless charging connection between the authenticated user's mobile device and a parked registered charging vehicle parked at a location within the preset distance of the authenticated user's mobile device, the parked registered charging vehicle being selected by the user from the parked location information; and
automatically controlling charging the authenticated user's mobile device according to the authenticated user's charging profile and the parked registered charging vehicle's charge supply profile.

19. The non-transitory article of manufacture of claim 18, wherein the instructions further cause the computer to perform selecting one of the one or more registered charging vehicles within the preset distance range of the authenticated user based on an energy allocation criteria and automatically establishing a charging connection between the authenticated user and the selected registered vehicle charging station for charging the authenticated user's mobile device.

20. The non-transitory article of manufacture of claim 19, wherein the instructions further cause the computer to perform authenticating a plurality of mobile device users as ad hoc charging system registered users in the ad hoc parked vehicle charging system, and using information related to energy need of the mobile device of each of the plurality of authenticated mobile device users, the location of each of the mobile devices, and the state of charge of each charging station with the preset distance to decide how to allocate the energy based on the energy allocation criteria.

\* \* \* \* \*